United States Patent
Rangappagowda et al.

(10) Patent No.: US 10,511,516 B2
(45) Date of Patent: Dec. 17, 2019

(54) METHODS, SYSTEMS AND COMPUTER READABLE MEDIA FOR QUIESCENCE-INFORMED NETWORK TESTING

(71) Applicant: Ixia, Calabasas, CA (US)

(72) Inventors: Madhu Hosakoppa Rangappagowda, Cary, NC (US); Nicolas Ribault, Issy les Moulineaux (FR); Vihari Durga Pragada, Cary, NC (US)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 213 days.

(21) Appl. No.: 15/608,352

(22) Filed: May 30, 2017

(65) Prior Publication Data

US 2018/0062972 A1    Mar. 1, 2018

Related U.S. Application Data

(60) Provisional application No. 62/380,946, filed on Aug. 29, 2016.

(51) Int. Cl.
    *H04L 12/26*     (2006.01)

(52) U.S. Cl.
    CPC .......... *H04L 43/50* (2013.01); *H04L 43/0858* (2013.01); *H04L 43/0876* (2013.01)

(58) Field of Classification Search
    CPC ............................... H04L 43/00; H04L 43/50
See application file for complete search history.

(56) References Cited

U.S. PATENT DOCUMENTS

| | | | |
|---|---|---|---|
| 6,073,085 A | 6/2000 | Wiley et al. | |
| 6,549,882 B1 | 4/2003 | Chen et al. | |
| 6,625,648 B1 | 9/2003 | Schwaller et al. | |
| 6,625,750 B1 * | 9/2003 | Duso ................... | G06F 11/2028 714/11 |
| 6,651,093 B1 | 11/2003 | Wiedeman et al. | |
| 6,763,380 B1 | 7/2004 | Mayton et al. | |
| 7,278,061 B2 | 10/2007 | Smith | |
| 7,730,029 B2 | 6/2010 | Molotchko et al. | |

(Continued)

FOREIGN PATENT DOCUMENTS

| KR | 10-1401990 B1 | 6/2014 |
|---|---|---|
| WO | WO 2016/077084 A1 | 5/2016 |

OTHER PUBLICATIONS

Notice of Allowance and Fee(s) Due for U.S. Appl. No. 14/581,931 (dated Dec. 19, 2016).

(Continued)

*Primary Examiner* — Esther B. Henderson

(57) ABSTRACT

The subject matter described herein includes methods, systems, and computer readable media for quiescence-informed network testing. One method for quiescence-informed network testing includes determining, by a first test agent, a quiescence state of the network. The method further includes reporting, by the first test agent and to a test controller, the quiescence state of the network. The method further includes configuring, by the test controller, the first test agent to execute a network test. The method further includes executing, by the first test agent, the network test. The method further includes reporting results of execution of the network test to the test controller.

16 Claims, 5 Drawing Sheets

(56) References Cited

U.S. PATENT DOCUMENTS

| | | | |
|---|---|---|---|
| 9,356,855 | B2 | 5/2016 | Gintis |
| 9,641,419 | B2 | 5/2017 | Gintis |
| 10,205,938 | B2 | 2/2019 | Regev et al. |
| 10,425,320 | B2 | 9/2019 | Nistor et al. |
| 2003/0086425 | A1 | 5/2003 | Bearden et al. |
| 2003/0149765 | A1 | 8/2003 | Hubbard et al. |
| 2004/0003068 | A1 | 1/2004 | Boldman et al. |
| 2004/0066748 | A1* | 4/2004 | Burnett ............ H04L 43/50 370/241.1 |
| 2004/0193709 | A1 | 9/2004 | Selvaggi et al. |
| 2005/0050190 | A1 | 3/2005 | Dube |
| 2006/0146703 | A1 | 7/2006 | Cha et al. |
| 2007/0081467 | A1 | 4/2007 | Hurst et al. |
| 2008/0010523 | A1 | 1/2008 | Mukherjee |
| 2008/0056131 | A1* | 3/2008 | Balakrishnan ...... H04L 41/142 370/232 |
| 2008/0126561 | A1 | 5/2008 | Ryu et al. |
| 2009/0097409 | A1 | 4/2009 | Akhter et al. |
| 2010/0177644 | A1 | 7/2010 | Kucharczyk |
| 2011/0170433 | A1 | 7/2011 | Scobbie |
| 2012/0311132 | A1 | 12/2012 | Tychon et al. |
| 2014/0047112 | A1 | 2/2014 | Komiya et al. |
| 2014/0169189 | A1 | 6/2014 | Kalkunte |
| 2014/0229605 | A1 | 8/2014 | Besser |
| 2014/0355613 | A1 | 12/2014 | Pope et al. |
| 2015/0106670 | A1 | 4/2015 | Gintis |
| 2015/0188788 | A1 | 7/2015 | Kolesnik et al. |
| 2016/0080243 | A1* | 3/2016 | Kodama ............ H04L 41/0806 370/252 |
| 2016/0087861 | A1 | 3/2016 | Kuan et al. |
| 2016/0134864 | A1 | 5/2016 | Regeve et al. |
| 2016/0182310 | A1 | 6/2016 | Gintis |
| 2017/0171044 | A1 | 6/2017 | Das et al. |
| 2017/0180233 | A1 | 6/2017 | Nistor et al. |

OTHER PUBLICATIONS

"IxNetwork™ AVB Solution," Data Sheet, Document No. 915-1889-01 Rev A, www.ixiacom.com, pp. 1-18 (Oct. 2014).

Kreibich et al., "Netalyzr: Illuminating Edge Network Neutrality, Security, and Performance," TR-10-006, International Computer Science Institute, pp. 1-17 (May 2010).

"Hawkeye—Active Network Monitoring Platform," www.ixia.com, https://www.ixiacom.com/sites/default/files/2017-08/Ixia-V-DS-Hawkeye.pdf, pp. 1-7 (Aug. 2017).

"XR2000 Active Monitoring Hardware Endpoint for the Hawkeye™ and IxChariot® Product Lines," www.ixia.com, https://www.ixiacom.com/sites/default/files/resources/datasheet/xr2000.pdf, pp. 1-2 (Feb. 2016).

Notice of Allowance and Fee(s) Due for U.S. Appl. No. 14/984,459 (dated Jan. 18, 2019).

Notice of Allowance and Fee(s) Due and Applicant-Initiated Interview Summary, for U.S. Appl. No. 14/537,851 (dated Sep. 17, 2018).

Final Office Action for U.S. Appl. No. 14/984,459 (dated Jul. 12, 2018).

Communication of the extended European search report for European Application No. 15858789.9 (dated May 17, 2018).

Non-Final Office Action for U.S. Appl. No. 14/537,851 (dated Mar. 21, 2018).

Non-Final Office Action for U.S. Appl. No. 14/984,459 (dated Dec. 1, 2017).

Advisory Action for U.S. Appl. No. 14/537,851 (dated Sep. 20, 2017).

Communication of European publication number and information on the application of Article 67(3) EPC for European Patent Application No. 15858789.9 (dated Aug. 23, 2017).

Final Office Action for U.S. Appl. No. 14/537,851 (dated May 19, 2017).

Non-Final Office Action for U.S. Appl. No. 14/537,851 (dated Oct. 6, 2016).

Advisory Action & AFCP 2.0 Decision for U.S. Appl. No. 14/537,851 (dated Sep. 15, 2016).

Final Office Action for U.S. Appl. No. 14/537,851 (dated Jun. 6, 2016).

Notification of Transmittal of the International Search Report and the Written Opinion of the International Searching Authority, or the Declaration for International Application No. PCT/US2015/058297 (dated Feb. 24, 2016).

Non-Final Office Action for U.S. Appl. No. 14/537,851 (dated Nov. 20, 2015).

"IEEE Standard for Local and metropolitan area networks—Audio Video Bridging (AVB) Systems," IEEE Standards Association, IEEE Computer Society, IEEE Std 802.1BA™-2011, pp. 1-45 (Sep. 30, 2011).

"IEEE Standard for Layer 2 Transport Protocol for Time-Sensitive Applications in Bridged Local Area Networks," IEEE Standards Association, IEEE Computer Society, IEEE Std 1722™-2011, pp. 1-57 (May 6, 2011).

"IEEE Standard for Layer 3 Transport Protocol for Time-Sensitive Applications in Local Area Networks," IEEE Standards Association, IEEE Computer Society, IEEE Std 1733™-2011, pp. 1-21 (Apr. 25, 2011).

Teener, Michael Johas, "No-excuses Audio/Video Networking: the Technology Behind AVnu," AVnu™ Alliance White Paper, pp. 1-10 (Aug. 24, 2009).

Notice of Allowance and Fee(s) Due for U.S. Appl. No. 14/984,459 (dated Apr. 15, 2019).

Commonly-assigned, co-pending U.S. Appl. No. 16/251,365 for "Methods, Systems and Computer Readable Media for Proactive Network Testing," (Unpublished, filed Jan. 18, 2019).

Communication pursuant to Article 94(3) EPC for European Patent Application Serial No. 15 858 789.9 (dated Mar. 29, 2019).

* cited by examiner

METHODS, SYSTEMS AND COMPUTER READABLE MEDIA FOR QUIESCENCE-INFORMED NETWORK TESTING

PRIORITY CLAIM

This application claims the priority benefit of U.S. Provisional Patent Application Ser. No. 62/380,946, filed Aug. 29, 2016, the disclosure of which is incorporated herein by reference in its entirety.

TECHNICAL FIELD

The subject matter described herein relates to testing communications network equipment. More particularly, the subject matter described herein relates to methods, systems, and computer readable media for quiescence-informed network testing.

BACKGROUND

Data network service providers (such as Internet service providers), network users, and application providers all have an interest in learning how data network traffic of a particular type is treated by the network. For example, data network service providers may wish to monitor how application traffic of different types is treated by their networks and by other networks to ensure compliance with net neutrality regulations, service level agreements with other service providers, and service level agreements with end users. Network users, including individuals, businesses, and other entities, may desire to know how application traffic is treated to identify when a network service provider is throttling traffic and whether the throttling is consistent with the service agreement between the network service providers and the users. Application services providers may wish to know how their traffic is treated in the network, for example to identify when their traffic is throttled by the network service provider.

Performance testing is one way to identify how traffic of a particular application type is being treated by the network. In some performance testing, it may be desirable to minimize the impact of the testing on network performance. For example, if tests are run during busy network periods in a live network, the quality of service experienced by network users may be reduced by the presence of test traffic. In other performance testing, it may be desirable to execute a test when the network is busy to determine how application traffic is treated in a busy network.

Accordingly, there exists a need for methods, systems, and computer readable media for quiescence-informed network testing.

SUMMARY

The subject matter described herein includes methods, systems, and computer readable media for quiescence-informed network testing. One method for quiescence-informed network testing includes determining, by a first test agent, a quiescence state of the network. The method further includes reporting, by the first test agent and to a test controller, the quiescence state of the network. The method further includes configuring, by the test controller, the first test agent to execute a network test. The method further includes executing, by the first test agent, the network test. The method further includes reporting results of execution of the network test to the test controller.

The subject matter described herein for testing a network device using a variable burst profile may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
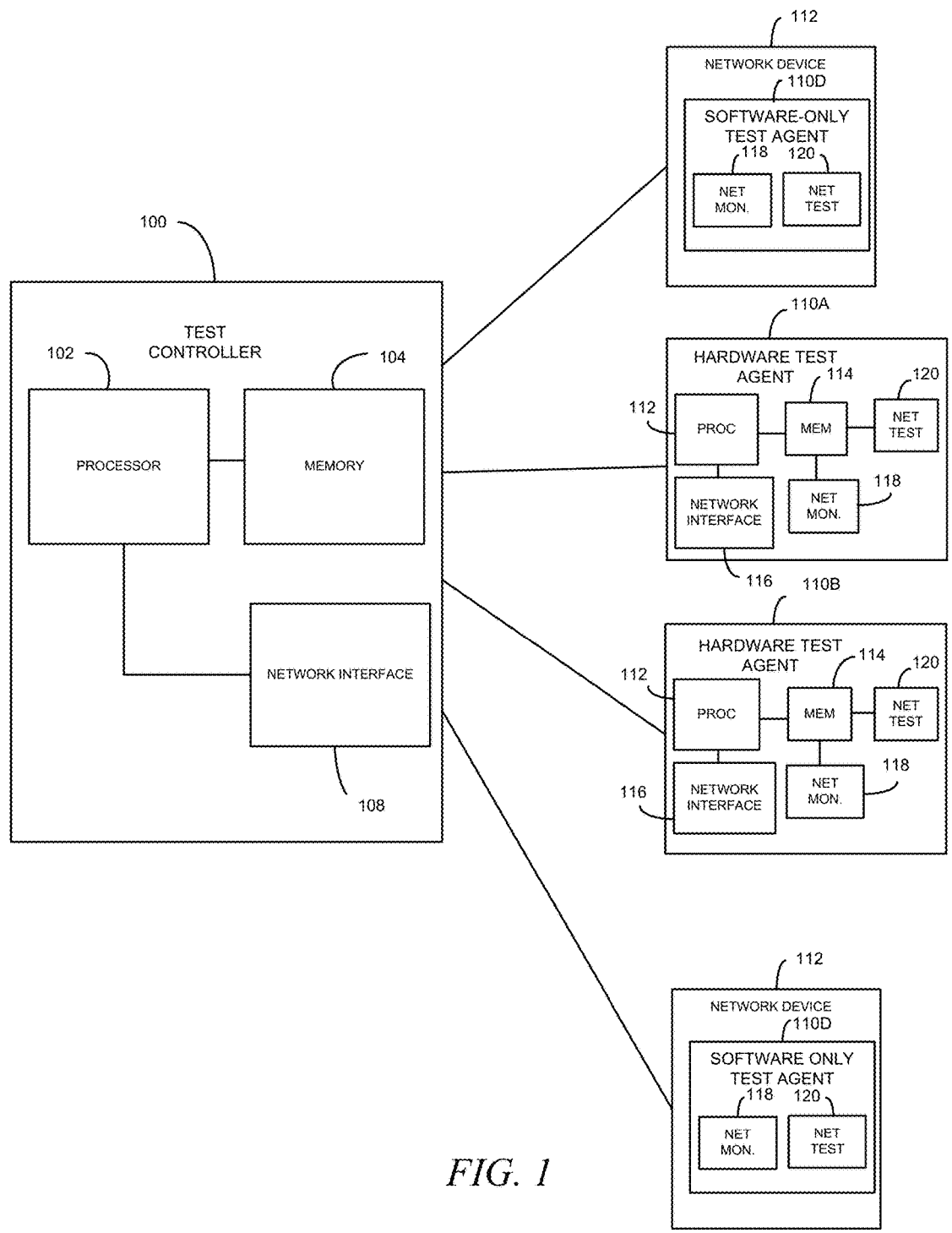
FIG. 1 is a network diagram illustrating an exemplary system for quiescence-informed network testing according to an embodiment of the subject matter described herein.

The subject matter described herein includes methods, systems, and computer readable media for quiescence-informed network testing. FIG. 1 is a block diagram illustrating a system for quiescence-informed network testing according to an embodiment of the subject matter described herein. Referring to FIG. 1, a network equipment test controller 100 includes at least one processor 102 and memory 104. Network equipment test controller 100 further includes a network interface 106 and a test configuration and monitoring interface 108. In one example, test controller 100 may be implemented using the Hawkeye™ web server available from Ixia of Calabasas, Calif.

The system illustrated in FIG. 1 further includes one or more test agents. Test agents may include hardware test agents 110A and 110B, each of which includes a processor 112, memory 114, and a network interface 116. Hardware test agents 110A and 110B may further include network monitoring functions 118 that monitor network activity and report quiescence state of the network to test controller 100.

Hardware test agents 110A and 110B may also include network test functions 120 that implement network tests using test configuration information obtained from test controller 100.

Hardware test agents 110A and 110B are designed to be deployed in live networks to perform network testing and monitoring. An example of a hardware platform suitable for implementing hardware test agents 110A and 110B includes the XR2000 Active Monitoring Hardware Agent available from Ixia of Calabasas, Calif. Test agents may also include software-only test agents 110C and 110D designed to execute on and utilize the resources of network devices 112, which may be data center file servers, access points, or other network devices. Software-only test agents 110C and 110D may perform the same functions as hardware test agents 110A and 110B. For example, software-only test agents 110C and 110D may include network monitoring functions 118 that monitor network activity and report the quiescence state of the network to test controller 100. In addition, software-only test agents 110C and 110D may include network test functions 120 that implement network tests using test configuration information obtained from test controller 100.

Hardware test agents 110A and 110B and software-only test agents 110C and 110D are configurable by test controller 100 to perform active monitoring and network testing. According to one aspect of the subject matter described herein, test controller 100 configures hardware test agents 110A and 110B and/or software-only agents 110C and 110D to detect the quiescence state of the network and report the quiescence state to test controller 100. In response to receiving notification of the quiescence state, test controller 100 may configure agents 110A-110D to perform network testing, such as performance testing to monitor user experience, service provider compliance with service level agreements, or service provider treatment of particular application traffic, if the quiescence state indicates that network activity is below a desired threshold level. Such performance testing may include sending synthetic application traffic of a particular type (such as streaming video traffic) from one test agent to another test agent over the network to monitor how the network performs for the application traffic of the particular type. For example, it may be desirable to monitor how the network treats social media traffic, such as Facebook traffic or streaming media service traffic, such as Netflix or YouTube traffic. It may be of particular interest to determine whether any of the traffic of the particular application types is being throttled by the network service provider. Performance metrics, such as bit rate, jitter, and latency may be obtained for the synthetic application traffic of the particular type and compared to service level agreements. If synthetic streaming video traffic is being transmitted over the network, the average bit rate, latency, and jitter may be recorded and compared to parameters of a network user's subscription with the user's data network service provider.

In one example, test agents 110A-110D may execute network performance tests during quiescent periods (i.e., when network activity is below a threshold level) and report the results to test controller 100. The results may include network performance measurements, such as bit rate, jitter, and latency for the simulated network traffic of the particular type. Test agents 110A-110D may refrain from executing the performance tests when the network is not in a quiescent state. By detecting quiescent periods and performing network testing only during the quiescent periods, the impact of testing on network performance is reduced.

In another example, test agents 110A-110D may execute network tests when the network is in a non-quiescent state, for example, to determine how different types of application traffic is treated during busy periods. Controller 100 may report results of such testing, along with the detected quiescence state, in a report that shows treatment of different traffic types as a function of network quiescence.

Figure 2:
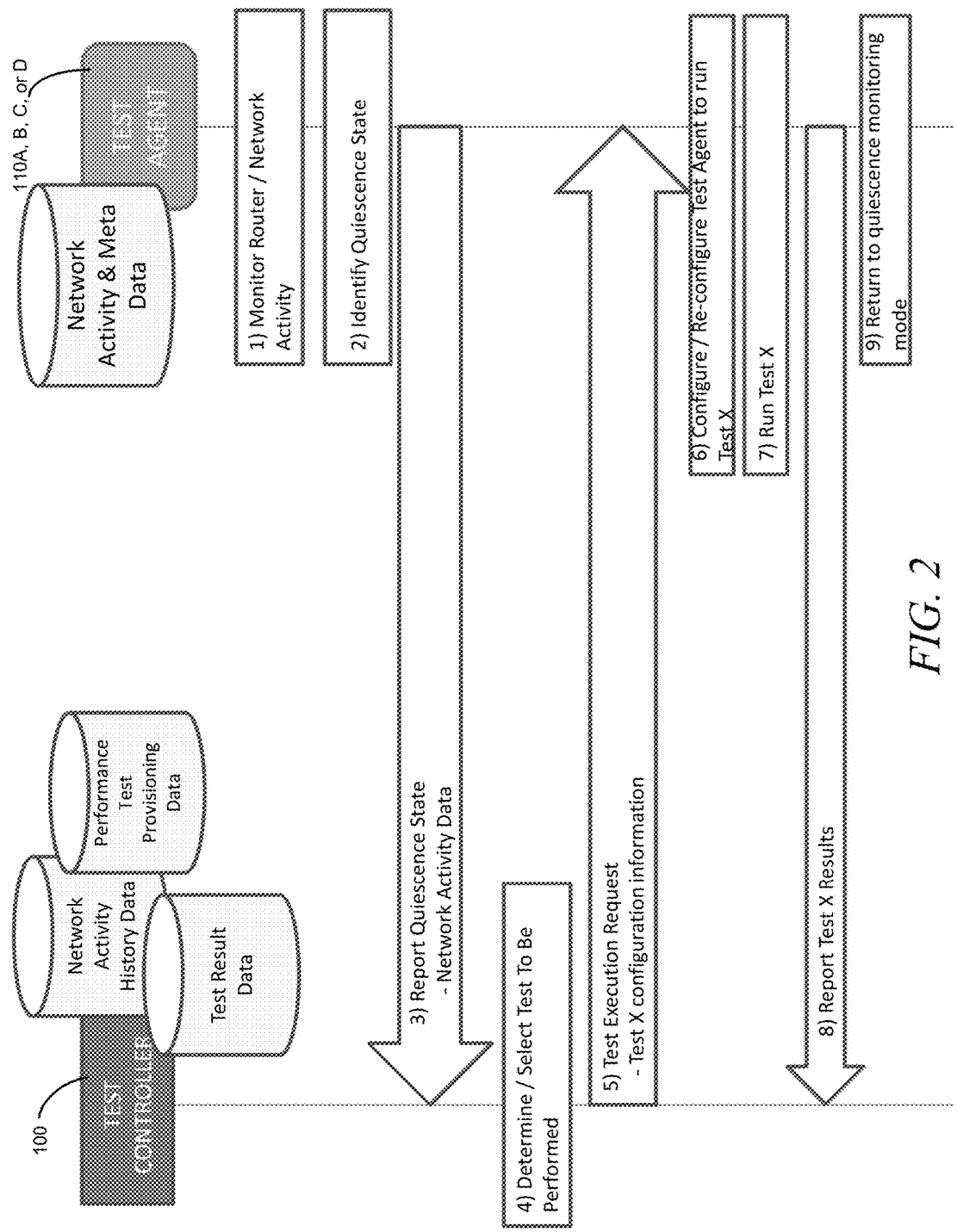
FIG. 2 is a message flow diagram illustrating a message flow for quiescence-informed network testing according to an embodiment of the subject matter described herein.
Figure 3:
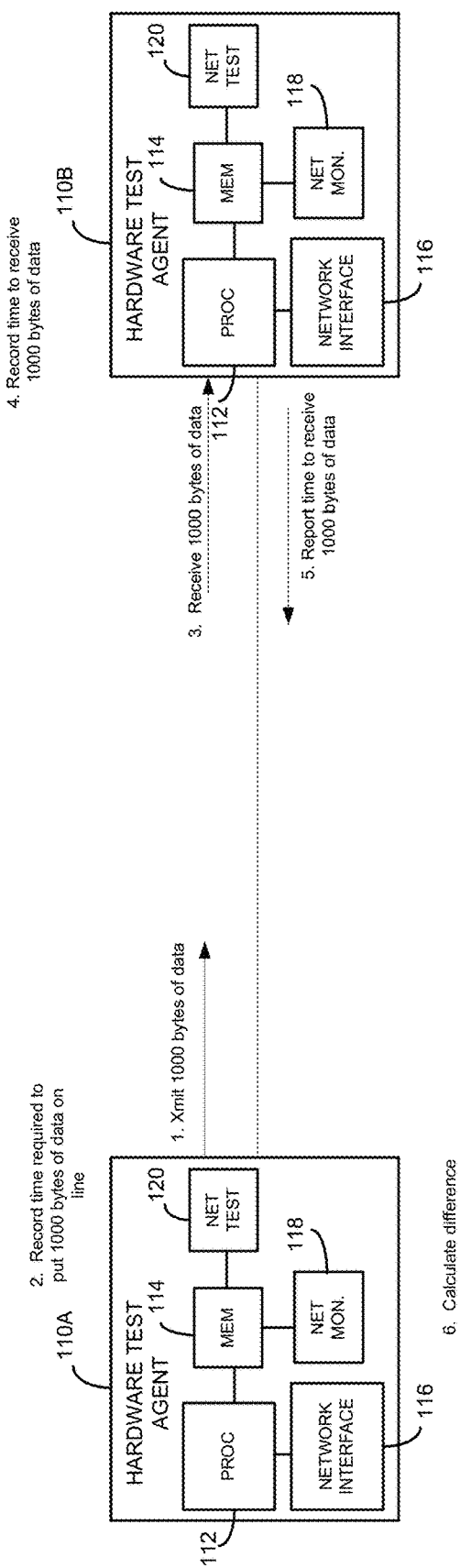
FIG. 3 is a network diagram illustrating an exemplary process for measuring network quiescence according to an embodiment of the subject matter described herein.

FIG. 2 is a message flow diagram illustrating exemplary messaging that may be exchanged between test controller 100 and one of test agents 110A-D according to the subject matter described herein. Referring to FIG. 2, in step 1 of the message flow diagram, one of test agents 110A-D monitors network activity to determine the quiescence state of the network. Monitoring network activity may include passively monitoring network traffic or executing a quiescence test. Executing a quiescence test may include transmitting a burst of traffic from the first test agent to a second test agent, measuring a time to transmit the burst, measuring a time to receive the burst, comparing the time to transmit the burst and the time to receive the burst, and identifying the quiescence state based on results of the comparison. FIG. 3 illustrates this quiescence test procedure in more detail. In FIG. 3, in step 1, test agent 110A places 1000 bytes of data onto the transmission medium to test agent 110B. In step 2, test agent 110A records the amount of time required to place the 1000 bytes onto the transmission medium from the time that the first bit is transmitted to the time that the last bit is transmitted. In this example, it is assumed that line rate transmission of 1 Gbps is achieved and thus it takes approximately:

$$(8000 \text{ bits})*(1*10^{-6} \text{ s per bit})=0.008 \text{ s or 8 milliseconds}$$

In step 3, test agent 110B receives the 1000 bytes of data from test agent 100A. In step 4, test agent 110B records the amount of time it takes to receive the 8000 bits from the transmission medium measured from the time that the first bit is received until the time that the last bit is received. In step 5, test agent 110B reports the time to receive the 1000 bytes to test agent 110A.

In step 6, test agent 110A calculates the difference between the time to transmit the 1000 bytes and the time to receive the 1000 bytes and reports the result to the test controller (not shown in FIG. 3). If the network is in a busy state, some of the transmitted bytes may be delayed, and, as a result, it may take longer than 8 milliseconds to receive the transmitted data. If it takes approximately 8 milliseconds to receive the transmitted bytes after the first byte is received, it can be assumed that the network is in a quiescent state. Thus, test agent 110B may transmit a message back to the transmitting test agent 110A with a report on the time to receive the packets. In this example, it is assumed that it takes 8 msec to receive the bytes. Test agent 110A compares the time to transmit the bytes to the time required to receive the bytes. In this example, the times are equal. Accordingly, test agent 110A may report to test controller 100 that the network is in a quiescent state. In another example, the time to receive the bytes may be greater than the time to transmit the bytes, and test agent 110A may report the difference between the times to transmit and receive the bytes as the quiescence state of the network, where the difference quantifies the occupancy of the network.

Returning to FIG. 2, in step 2, the test agent 110A, B, C, or D determines the quiescence state of the network and in step 3 reports the quiescence state to test controller 100. In step 4 of the message flow diagram in FIG. 2, test controller 100 selects a test to be performed. One example of a test that may be performed is a streaming video test where one test agent transmits streaming video to another test agent, and the receiving agent monitors the bit rate, jitter, delay, or other metric of quality of the received video. In step 5, test controller 100 transmits a test execution request to test agent 110A, B, C or D with configuration data for implementing the test. If more than one agent is involved in the test, test controller 100 may transmit test configuration data to each agent involved in the test.

In step 6, the test agent configures itself using the configuration data received from the test controller, and in step 7 executes the test. Continuing with the streaming video example, the test agent may stream video to another agent, and either the transmitting or receiving agent may report (step 8) results, such as bitrate, jitter, and latency to test controller 100. In step 9, the test agent returns to its monitoring mode for identifying the quiescence state of the network.

It should be noted that performance test software may be loaded on the test agents prior to initiation of the quiescence monitoring. In such an example, the test controller may configure the test agents to execute the performance test by sending messages to the test agents indicating which performance test to perform.

Figure 4:
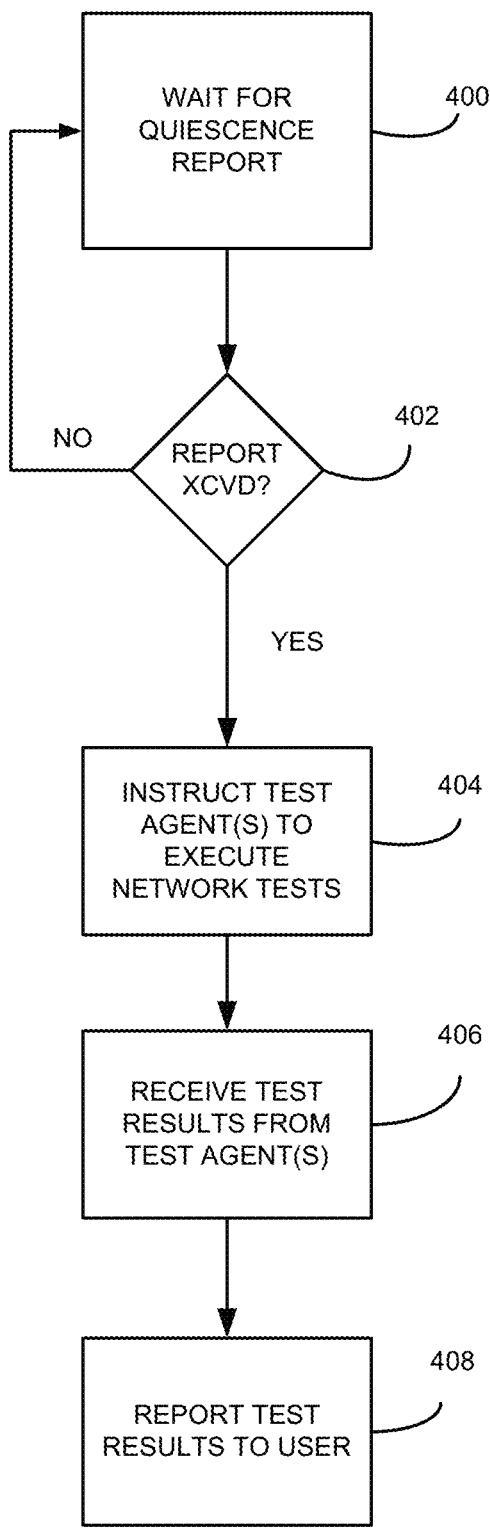
FIG. 4 is a flow chart illustrating an exemplary process performed by a test controller in implementing quiescence-informed network testing according to an embodiment of the subject matter described herein.

FIG. 4 is a flow chart illustrating an exemplary process for network testing implemented by a test controller according to the subject matter described herein. Referring to FIG. 4, in step 400, the test controller waits for a report of the quiescence state from one of the test agents. In step 402, the test controller determines whether a report of quiescence has been received. If a report has not been received the test controller continues to wait for a report. In step 402, if a quiescence report is received, control proceeds to step 404 where the test controller instructs the agent devices to execute network tests. In step 406, the test controller receives test results from the agent devices. In step 408, the test controller reports test results to the user.

The subject matter described herein is not limited to the process illustrated in FIG. 3 for identifying the quiescence state of the network. In another example, test agents 110A-110D may monitor traffic passing through an access point to determine the quiescence state of the network. Such monitoring may be performed by deploying a software-only test agent on the access point to monitor and record the volume of traffic passing through the access point and periodically report the quiescence state of the network to test controller 100.

Figure 5:
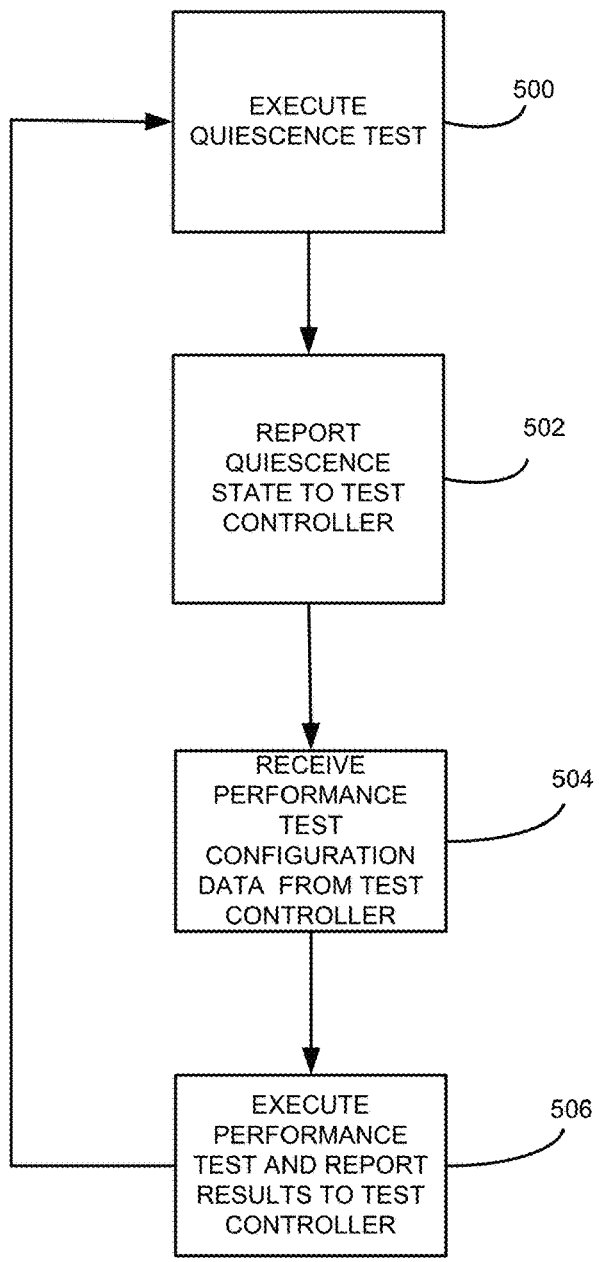
FIG. 5 is a flow chart illustrating exemplary steps performed by a test agent in implementing quiescence-informed network testing according to an embodiment of the subject matter described herein.

FIG. 5 is a flow chart illustrating exemplary steps that may be implemented by a test agent device according to an embodiment of the subject matter described herein. Referring to FIG. 5, in step 500, test agent executes a quiescence test. Executing the quiescence test may include the above described test where a burst of traffic is placed on the network, the time required to transmit the burst and to receive the burst are compared, and the presence, absence, or degree of quiescence is determined based on the difference in time required to transmit the burst and the time required to receive the burst. In another example, executing the quiescence test may include monitoring the volume of traffic in the network.

In step 502, the test agent reports the quiescence state to the test controller. The quiescence state may include an indicator of the presence, absence, or degree of activity in the network.

In step 504, the test agent receives performance test configuration data from the test controller. As stated above, in one example, the tests may include application-specific network tests, which may include generating synthetic application traffic of a particular type, transmitting the traffic from one test agent to one or more test agents over the network, and measuring performance of the network with respect to the application traffic of the particular type. Measurements that may be taken include bit rate, latency, jitter, etc.

In step 506, the test agent executes the performance test and reports test results, such as the aforementioned measurements, to the test controller. These measurements may be compared to corresponding performance parameters of a user's agreement with a service provide to determine whether the user is receiving the level of service agreed upon with the service provider. For example, the user contract for a downlink bit rate of 5 Gbps and may only receive 3 Gbps. In such a scenario it may be desirable to perform additional tests to determine the cause of the bandwidth shortfall. For example, it may be desirable to determine if other users are attached to the network during the test to determine whether the bandwidth sharing resulted in the lower bandwidth allocation to the agent running the test software. After step 506, control returns to step 500 where the process repeats. It should be noted that quiescence testing and reporting in steps 500 and 502 may be performed independently and even simultaneously with performance testing and reporting in step 506.

The subject matter described herein is not limited to only implementing network testing when the network is quiescent. For example, once the quiescence state (i.e., the degree of quiescence in the network) is determined, the test controller may instruct the test agents to conduct a test, and the controller may report the results of the test along with the quiescence state of the network. For example, if it is desirable to perform a particular test when the network is at least 50% occupied, the controller may instruct the test agents to execute the test when the quiescence report from the test agents indicates that the network is at least 50% occupied. The test agents may execute the test, and report the results to the controller. The controller may generate a report that indicates that test being performed, the results of the test, and the quiescence state during the test. It is also noted that the quiescence test, such as that illustrated in FIG. 3 may be performed repeatedly during testing, and controller may receive and report the real time quiescence state of the network along with test results.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for quiescence-informed network testing, the method comprising:
   determining, by a first test agent, a quiescence state of the network wherein determining the quiescence state of the network includes executing a quiescence test by:
   placing, by the first test agent, a burst of traffic onto a transmission medium;
   recording, by the first test agent, an amount of time to place the burst of traffic onto the transmission medium, wherein the amount of time is measured from a time that a first bit of the burst of traffic is placed onto the transmission medium to a time that a last bit of the burst of traffic is placed onto the transmission medium;
   receiving, by a second test agent, the burst of traffic from the transmission medium;

recording, by the second test agent, an amount of time for receiving the burst of traffic from the transmission medium, wherein the amount of time is measured from a time that a first bit of the burst of traffic is received from the transmission medium to a time that a last bit of the burst of traffic is received from the transmission medium;

reporting, by the second test agent to the first test agent, the amount of time for receiving the burst of traffic from the transmission medium; and calculating, by the first test agent, as an indication of the quiescence state of the network, a difference in the amount of time to place the burst of traffic onto the transmission medium and the amount of time for receiving the burst of traffic from the transmission medium;

reporting, by the first test agent and to a test controller, the indication of the quiescence state of the network;

configuring, by the test controller and in response to receiving the indication of quiescence state of the network, the first test agent to execute a network test;

executing, by the first test agent, the network test; and reporting results of execution of the network test to the test controller.

2. The method of claim 1 wherein the first test agent comprises a software-only test agent configured to execute on a network device and to perform network tests utilizing resources of the network device.

3. The method of claim 1 wherein the first test agent comprises a hardware test agent dedicated to testing the network.

4. The method of claim 1 wherein determining the quiescence state includes identifying the network as substantially unoccupied in response to the amount of time required to place the burst of traffic onto the transmission medium and the time to receive the burst of traffic from the transmission medium being substantially equal.

5. The method of claim 1 wherein determining the quiescence state comprises monitoring a volume of traffic in the network.

6. The method of claim 1 executing the network test includes executing an application-specific network test for monitoring performance of the network with respect to application traffic of a particular type.

7. The method of claim 6 wherein executing an application-specific network test includes transmitting synthetic application traffic for the application of the particular type from a first test agent to a second test agent and measuring network performance for the synthetic application traffic.

8. The method of claim 7 wherein the synthetic application traffic comprises streaming video traffic.

9. A system for quiescence-informed network testing, the system comprising:

a first test agent for determining a quiescence state of a network under test, and generating an indication of the quiescence state; a second test agent; and a test controller comprising a hardware device including a processor and a memory for receiving the indication of the quiescence state and, in response to receiving the indication of the quiescence state, for configuring the first test agent to execute a network test, wherein the first test agent executes the network test, wherein the first test agent is configured to determine the quiescence state of the network by executing a quiescence test and executing the quiescence test includes:

placing, by the first test agent, a burst of traffic onto a transmission medium;

recording, by the first test agent, an amount of time to place the burst of traffic onto the transmission medium, wherein the amount of time is measured from a time that a first bit of the burst of traffic is placed onto the transmission medium to a time that a last bit of the burst of traffic is placed onto the transmission medium;

receiving, by the second test agent, the burst of traffic from the transmission medium;

recording, by the second test agent, an amount of time for receiving the burst of traffic from the transmission medium, wherein the amount of time is measured from a time that a first bit of the burst of traffic is received from the transmission medium to a time that a last bit of the burst of traffic is received from the transmission medium;

reporting, by the second test agent to the first test agent, the amount of time for receiving the burst of traffic from the transmission medium; and calculating, by the first test agent, as the indication of the quiescence state of the network, a difference in the amount of time to place the burst of traffic onto the transmission medium and the amount of time for receiving the burst of traffic from the transmission medium.

10. The system of claim 9 wherein the first test agent comprises a software-only test agent configured to execute on a network device.

11. The system of claim 9 wherein the first test agent comprises a hardware device dedicated to network testing.

12. The system of claim 9 wherein the first test agent is configured to identify the network as substantially unoccupied in response to the amount of time required to place the burst of traffic onto the transmission medium and the amount of time required to receive the burst of traffic from the transmission medium being substantially equal.

13. The system of claim 9 wherein first test agent is configured to determine the quiescence state by monitoring a volume of traffic in the network.

14. The system of claim 9 the network test comprises an application-specific network test for monitoring performance of the network with respect to synthetic application traffic of a particular type.

15. The system of claim 14 wherein the synthetic application traffic includes streaming video.

16. A non-transitory computer readable medium having stored thereon executable instructions that when executed by the processor of a computer control the computer to perform steps comprising:

determining, by a first test agent, a quiescence state of the network wherein determining the quiescence state of the network includes executing a quiescence test by:

placing, by the first test agent, a burst of traffic onto a transmission medium;

recording, by the first test agent, an amount of time to place the burst of traffic onto the transmission medium, wherein the amount of time is measured from a time that a first bit of the burst of traffic is placed onto the transmission medium to a time that a last bit of the burst of traffic is placed onto the transmission medium;

receiving, by a second test agent, the burst of traffic from the transmission medium;

recording, by the second test agent, an amount of time for receiving the burst of traffic from the transmission medium, wherein the amount of time is measured from a time that a first bit of the burst of traffic is received from the transmission medium to a time that a last bit of the burst of traffic is received from the transmission medium;

reporting, by the second test agent to the first test agent, the amount of time for receiving the burst of traffic from the transmission medium; and calculating, by the first test agent, as an indication of the quiescence state of the network, a difference in the amount of time to place the burst of traffic onto the transmission medium and the amount of time for receiving the burst of traffic from the transmission medium;

reporting, by the first test agent and to a test controller, the indication of the quiescence state of the network;

configuring, by the test controller and in response to receiving the indication of the quiescence state of the network, the first test agent to execute a network test;

executing, by the first test agent, the network test; and reporting results of execution of the network test to the test controller.

\* \* \* \* \*